United States Patent [19]

Yamazaki et al.

[11] Patent Number: 5,734,939
[45] Date of Patent: Mar. 31, 1998

[54] CAMERA CAPABLE OF DISPLAYING INFORMATION RELATING TO THE NUMBER OF FRAMES OF FILM

[75] Inventors: Youichi Yamazaki, Kawasaki; Toshiyuki Nakamura, Tokyo; Keishi Urata, Kumamoto; Hitoshi Aoki; Daiki Tsukahara, both of Tokyo; Yoshikazu Iida, Chigasaki, all of Japan

[73] Assignee: Nikon Corporation, Tokyo, Japan

[21] Appl. No.: 786,973

[22] Filed: Jan. 24, 1997

[30] Foreign Application Priority Data

Jan. 26, 1996 [JP] Japan ................... 8-012045
Jan. 30, 1996 [JP] Japan ................... 8-014623

[51] Int. Cl.⁶ .................... G03B 1/66; G03B 17/36
[52] U.S. Cl. .................... 396/284; 396/207
[58] Field of Search .................... 396/284, 207

[56] References Cited

U.S. PATENT DOCUMENTS

| | | | |
|---|---|---|---|
| 4,299,466 | 11/1981 | Harvey | 396/284 |
| 4,494,843 | 1/1985 | Kobayashi et al. | 396/284 |
| 4,864,332 | 9/1989 | Harvey | 396/284 |
| 5,457,510 | 10/1995 | Yamazaki et al. | 396/207 |
| 5,548,359 | 8/1996 | Wakabayashi | 396/207 |
| 5,655,162 | 8/1997 | Nakamura et al. | 396/284 |

FOREIGN PATENT DOCUMENTS

| | | |
|---|---|---|
| A-6-250257 | 9/1994 | Japan. |
| A-7-64167 | 3/1995 | Japan. |
| A-7-114098 | 5/1995 | Japan. |

*Primary Examiner*—Russell E. Adams
*Attorney, Agent, or Firm*—Oliff & Berridge, PLC

[57] ABSTRACT

A camera adapted to receive a film cartridge having a recording member on which is recorded information relating to a total number of available frames in a film is provided. This camera includes an information detector that detects the information relating to the total number of available frames that is recorded on the recording member, a display unit that displays the information relating to the total number of available frames, an abnormality judging unit that determines whether any abnormality is present in the information relating to the total number of available frames that is detected by the information detector, and a display controller that controls a display of the display unit according to a result of judgement made by the abnormality judging unit.

6 Claims, 14 Drawing Sheets

5,734,939

1

CAMERA CAPABLE OF DISPLAYING INFORMATION RELATING TO THE NUMBER OF FRAMES OF FILM

BACKGROUND OF THE INVENTION

1. Field of the Invention

The present invention relates to a camera capable of detecting information relating to a film (such as information relating to the number of frames available for photographing), which information is recorded on a recording member of a film cartridge (such as a data disk on which a bar code pattern is printed), and displaying the information on a liquid crystal display.

2. Description of Related Art

There has been proposed a film cartridge which is provided with a data disc on which a bar code pattern representative of information relating to a film and others is imprinted, and wherein the data disc is rotatable with a film spool, as disclosed in Japanese laid-open Patent Publications Nos. 7-64167 and 7-114098, for example. There has been also disclosed in Japanese laid-open Patent Publication No. 6-250257 a camera capable of reading contents of the bar code pattern provided on this type of film cartridge, by use of optical means such as a photoreflector.

With various kinds of information, such as a film sensitivity and a total number of available frames of a film, recorded in the form of the bar code pattern, it is possible to display on a liquid crystal display on a camera body the total number of frames that is read from the bar code pattern, or the number of unexposed frames that is obtained by subtracting the number of frames that have been exposed for photographing use from the total number of frames originally contained in the film cartridge. Such a display allows a photographer to properly determine whether the film will have to be replaced by a new one in a short time.

If a foreign matter, such as a stain, is attached to the bar code pattern, however, the contents of the bar code pattern cannot be normally read, with a result that correct information is not displayed on the liquid crystal display. This makes it impossible for the photographer to determine how many pictures can still be taken with the film cartridge that is being used. When all of the frames originally contained in the film cartridge have been exposed, therefore, the photographer may not be able to immediately replace the film with a new one, with a possibility of losing a chance to release the camera shutter.

SUMMARY OF THE INVENTION

It is therefore an object of the present invention to provide a camera that can provide information on which the time of replacement of films can be judged, even if the camera cannot correctly detect information relating to the total number of available frames that is recorded on a recording member.

To accomplish the above object, there is provided a camera adapted to receive a film cartridge having a recording member on which is recorded information relating to a total number of available frames in a film, which camera comprises: an information detector that detects the information relating to the total number of available frames that is recorded on the recording member, a display unit that displays the information relating to the total number of available frames, an abnormality judging unit that determines whether any abnormality is present in the information relating to the total number of available frames that is

2 detected by the information detector, and a display controller that controls a display of the display unit according to a result of judgement made by the abnormality judging unit.

DETAILED DESCRIPTION OF THE PREFERRED EMBODIMENTS

First Embodiment

There will be explained the first embodiment of the present invention, referring to FIG. 1 through FIG. 11.

Figure 1:
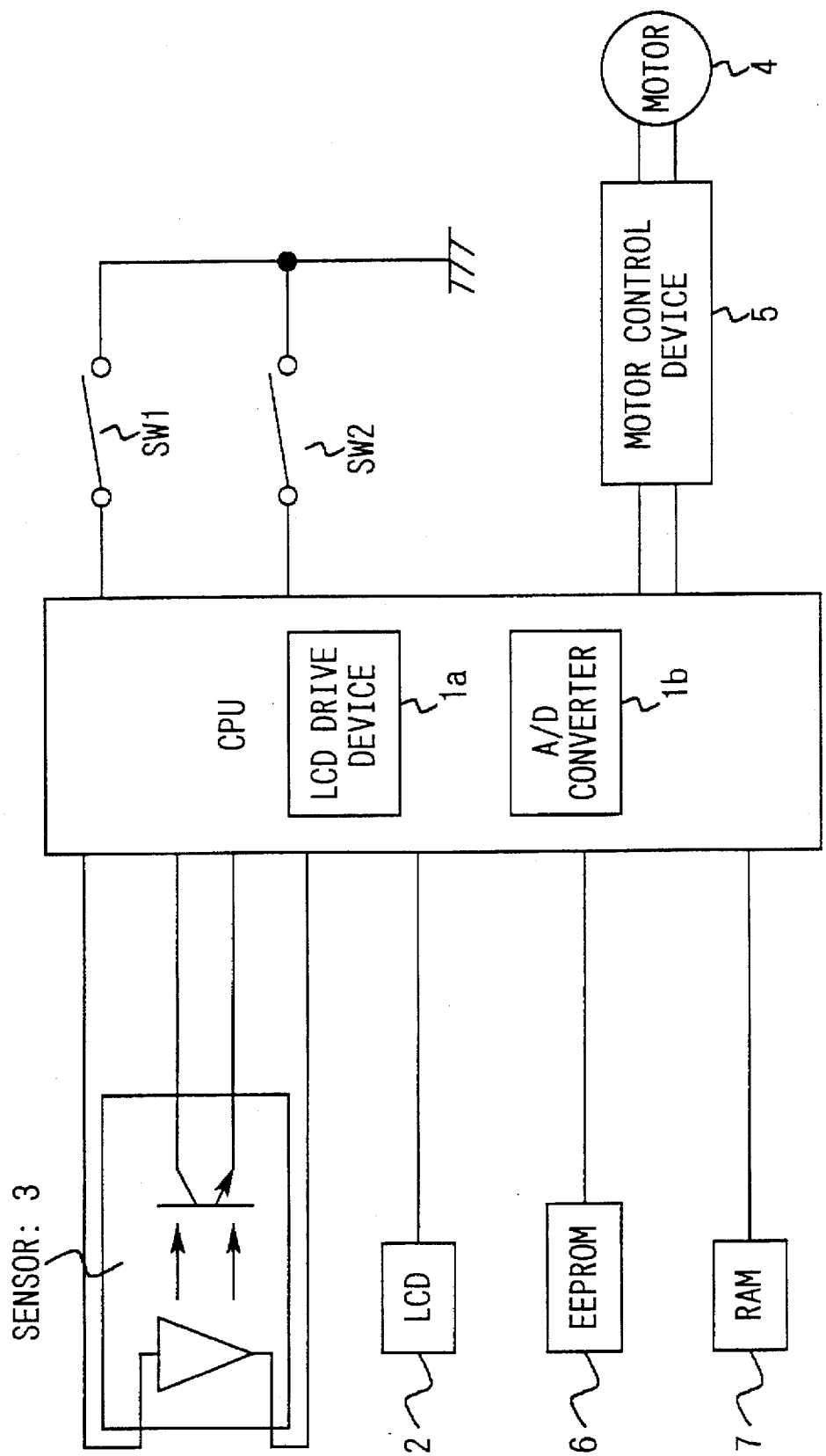
FIG. 1 is a block diagram showing the first embodiment of a camera of the present invention.

FIG. 1 is a block diagram of the first embodiment of the camera constructed according to the present invention. In FIG. 1, reference numeral 1 denotes a CPU that controls the whole device or camera and performs processing of FIGS. 5–11 which will be described later. Reference numeral 2 denotes a liquid crystal display (LCD) that is provided on a top face of the camera, for example, and provides an indication, when appropriate, that a film cartridge (hereinafter called simply as "cartridge") is loaded into a cartridge chamber of the camera body. Sensor 3 consists of a photoreflector or the like, and is adapted to optically detect a bar code pattern provided on the cartridge 2. Motor 4 is adapted to drive film spool and shielding door of the cartridge 2, and motor control device 5 is adapted to control the rotating direction and drive speed of the motor 4. EEPROM 6 stores a threshold value that provides a basis for determining whether the output level of the sensor 3 is a low level or a high level, while RAM 7 stores a threshold value(s) used for decoding the bar code pattern, and results of decoding. Within the CPU 1, there are incorporated LCD drive device 1a for performing display control of the liquid crystal display 2, and A/D converter 1b for converting analog signals that correspond to coded information detected by the sensor 3, into corresponding digital data. SW1 is a cartridge chamber lid switch (hereinafter referred simply as "cartridge lid switch") for detecting open and closed states of a lid (not shown) of the cartridge chamber in which the cartridge is detachably received, and SW2 is a release switch that is turned on when a shutter release button (not shown) is fully depressed.

Figure 2:
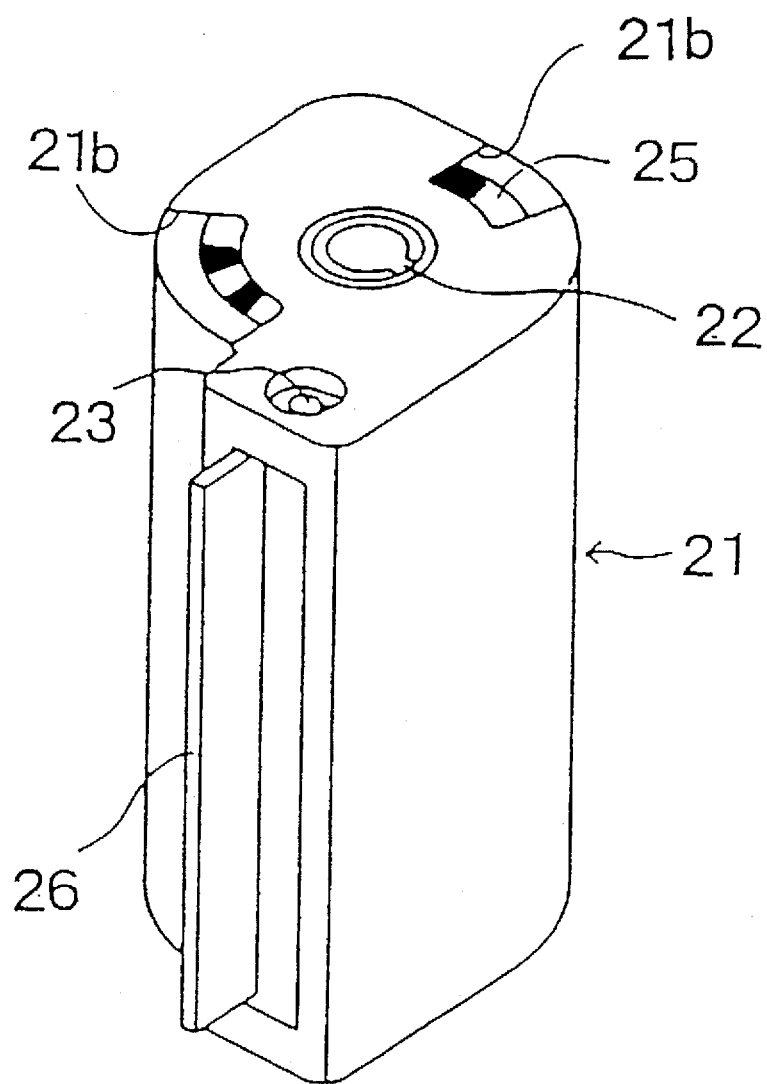
FIG. 2 is a perspective view showing a cartridge used with the embodiment of FIG. 1.

FIG. 2 is a perspective view of a cartridge used with the camera of the present embodiment. This cartridge has a spool 22 for transporting the film, and a data disc 25 that is rotatable with the spool 22. The bar code pattern is printed on the upper face of the data disc 25, and parts of the bar code pattern are exposed through windows 21a, 21b formed in the top face of the cartridge. This bar code pattern represents information relating to the film, including the sensitivity of the film and the number of frames available for photographing. Shielding door 26 allows the film to be rolled in and out, such that the film can be thrust or fed out of the cartridge 21 only when this shielding door 26 is open. The shielding door 26 is opened and closed in association with rotation of a shielding door shaft 23.

Figure 3:
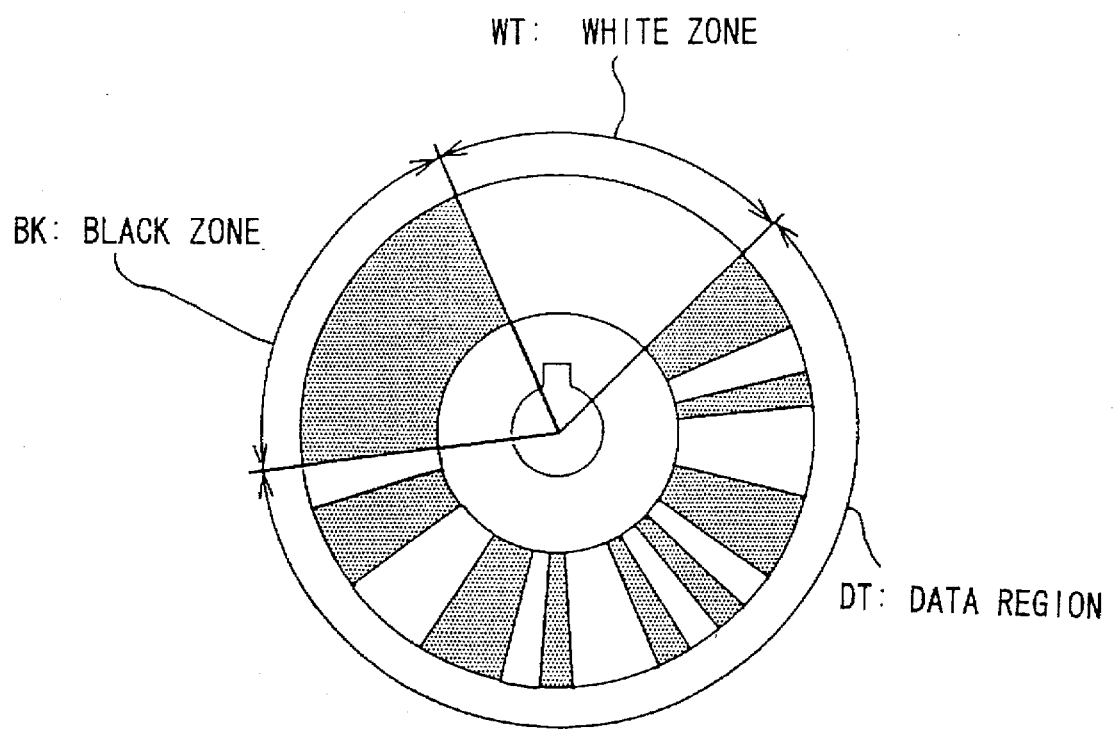
FIG. 3 is an enlarged view of a bar code pattern printed on an upper surface of a data disc.

FIG. 3 is an enlarged view of the bar code pattern printed on the upper surface of the data disc 25. The bar code pattern of the present embodiment is composed of a data region DT on which the information relating to the film is recorded, a black zone BK consisting solely of bar information, and a white zone consisting solely of space information. The data region DT consists of bar elements and space elements that are alternately arranged or interleaved, and each of the bar elements and spaces elements has a selected one of a narrow width and a wide width. Thus, various kinds of information can be represented by a pattern in the data region DT by suitably selecting the width of the bar and space elements that constitute the pattern.

Figure 4:
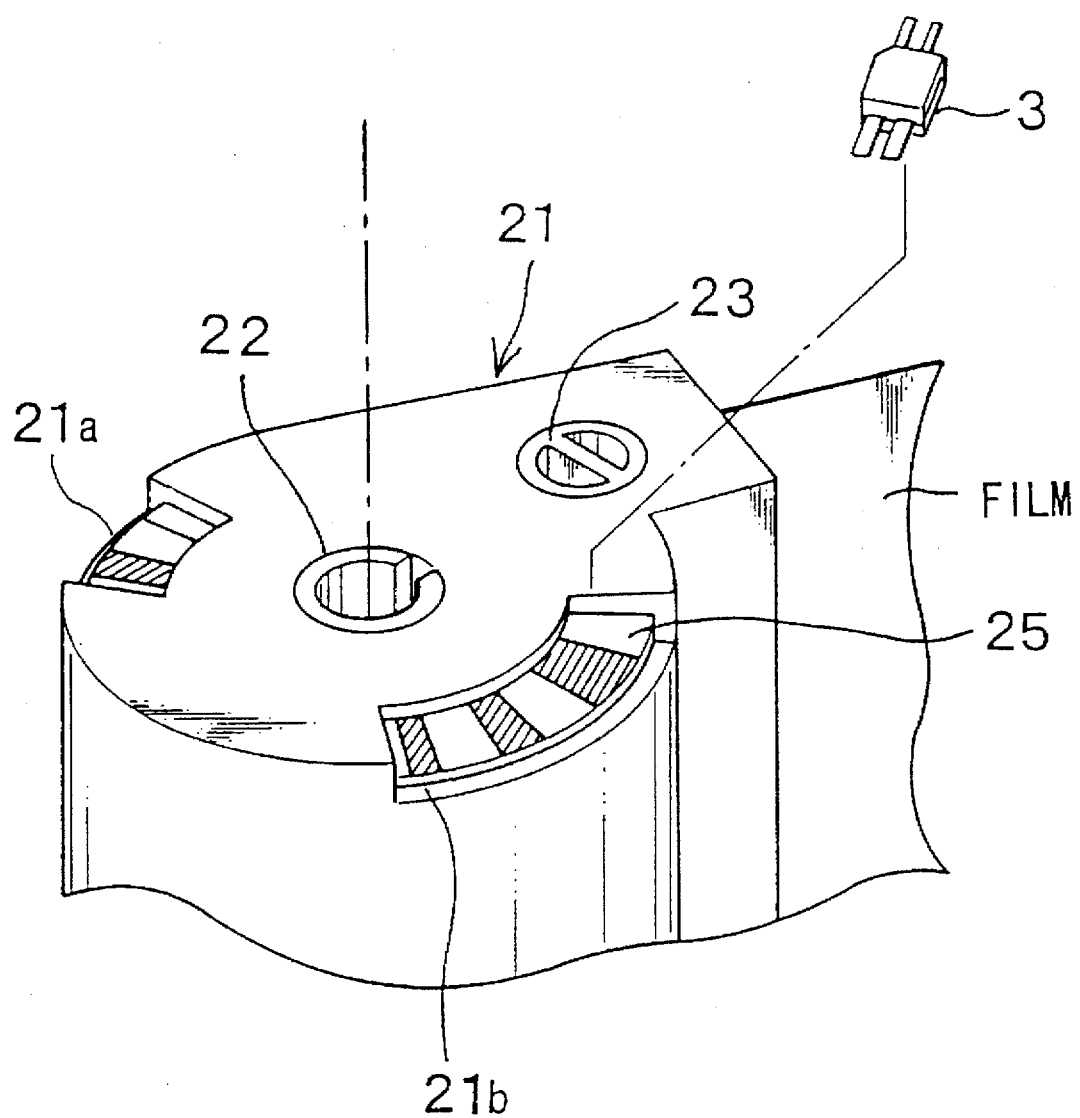
FIG. 4 is a perspective view showing an upper portion of the cartridge of FIG. 2.

FIG. 4 is a perspective view showing the upper portion of the cartridge of FIG. 2. As shown in this figure, two windows 21a, 22b are formed in the top face of the cartridge, such that the bar code pattern is partially exposed through these windows 21a, 21b. Sensor 3 disposed above one of the windows 21b detects coded information of the bar code pattern exposed through the window 21b. While no sensor is provided above the other window 21a in the present embodiment, another sensor may be disposed above the window 21a.

Figure 5:
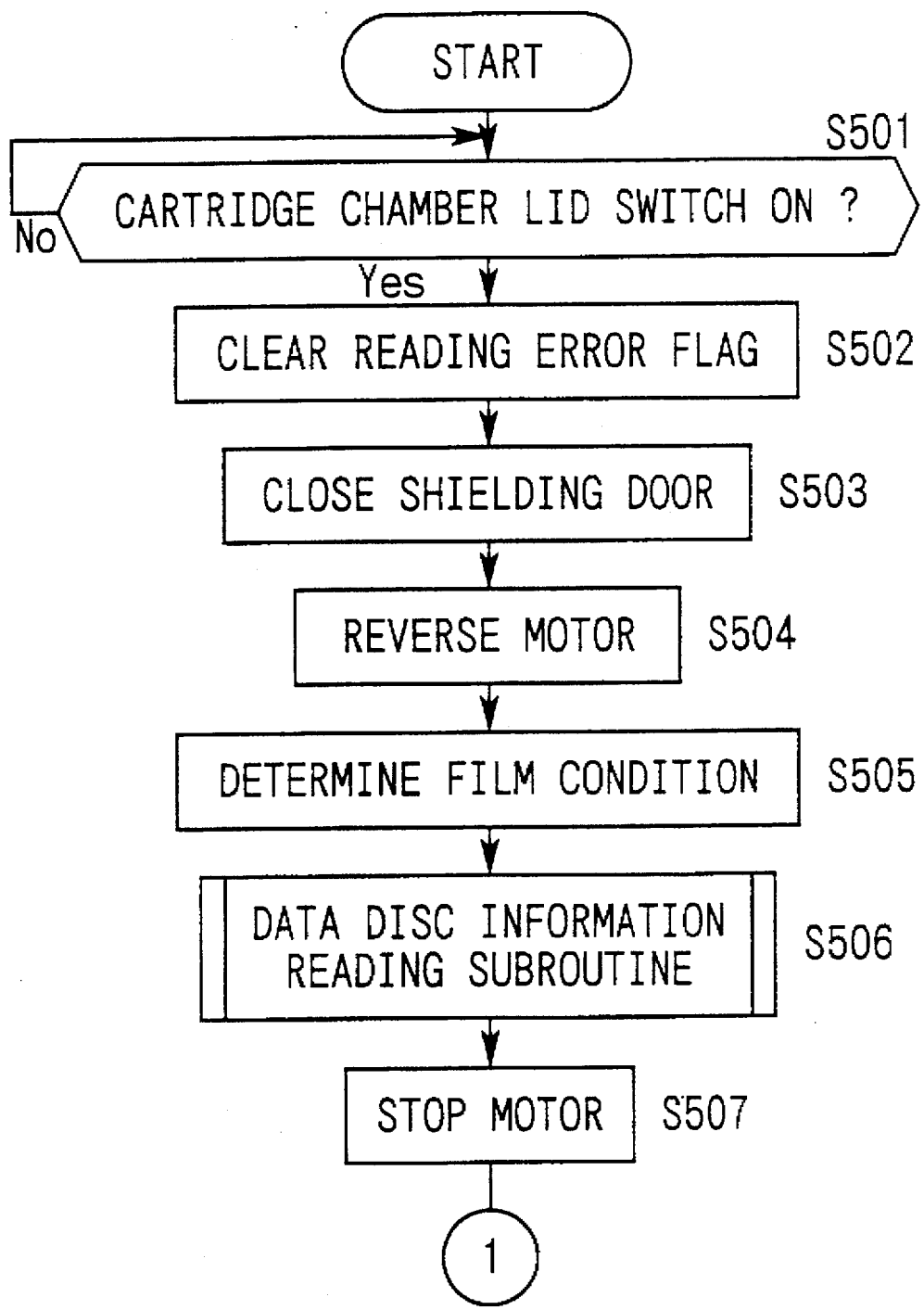
FIG. 5 is a flow chart showing a main routine executed by CPU of the first embodiment.
Figure 6:
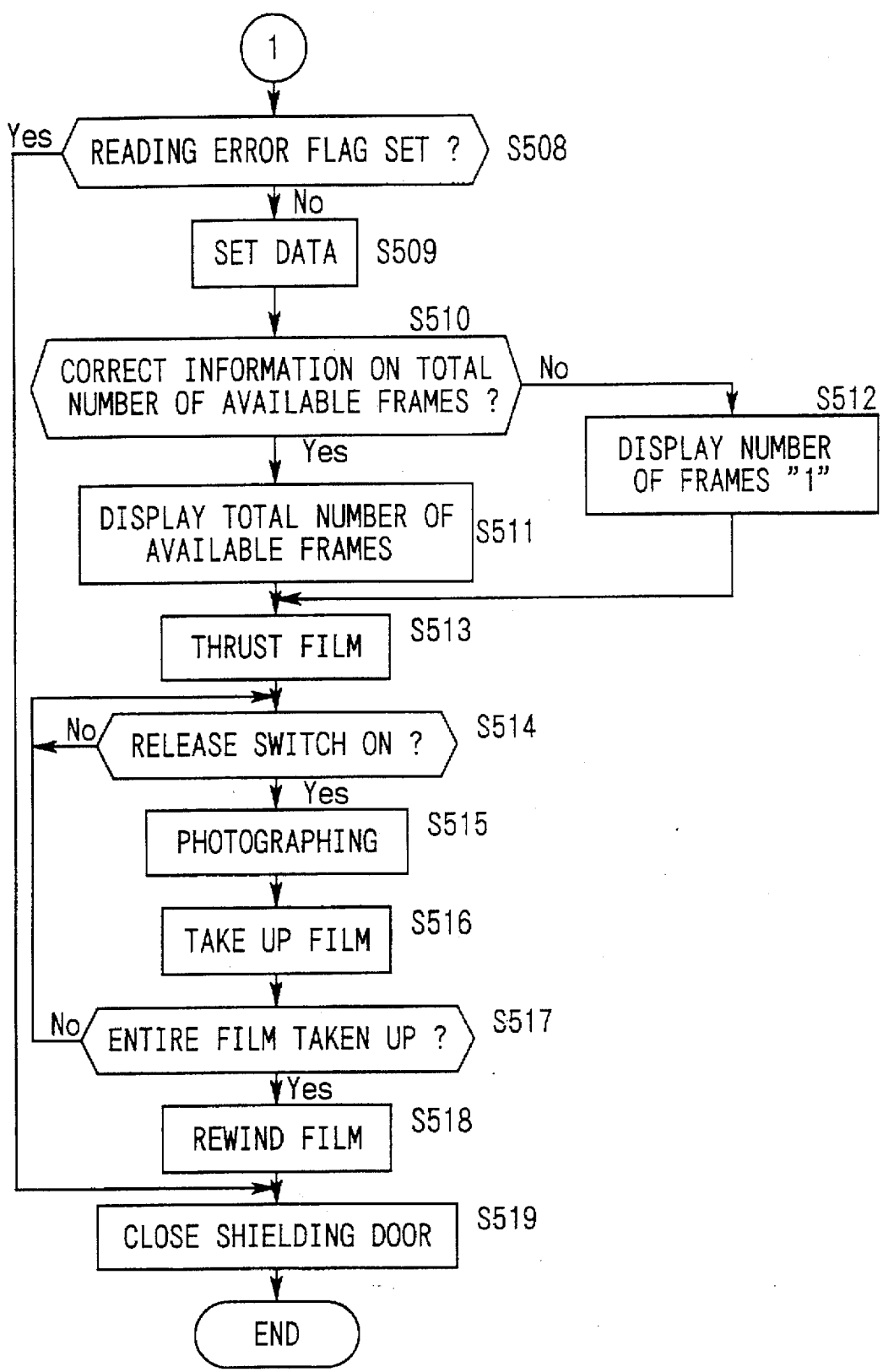
FIG. 6 is a flow chart following that of FIG. 5.

FIGS. 5 and 6 are flow charts showing a main routine executed by CPU 1. The operation of the first embodiment will be hereinafter explained referring to the flow charts. The CPU 1 starts the routine of FIGS. 5 and 6 once the cartridge 21 is loaded into the cartridge chamber.

In step S501, it is determined whether the cartridge lid has been closed or not. This step S501 judges that the cartridge lid has been closed if the cartridge lid switch SW1 is ON. Once the cartridge lid is closed, the control flow goes to step S502 to reset (clear) a reading error flag that is to be set when a bar code pattern cannot be normally read. In step S503, the motor 4 is driven forward so as to open the shielding door 26. At the same time, CPU 1 detects whether the shielding door 26 is completely opened or not, by means of a shielding door switch (not shown). Once it is confirmed that the shielding door 26 is fully opened, the control flow goes to step S504 to reverse the motor 4.

Figure 7:
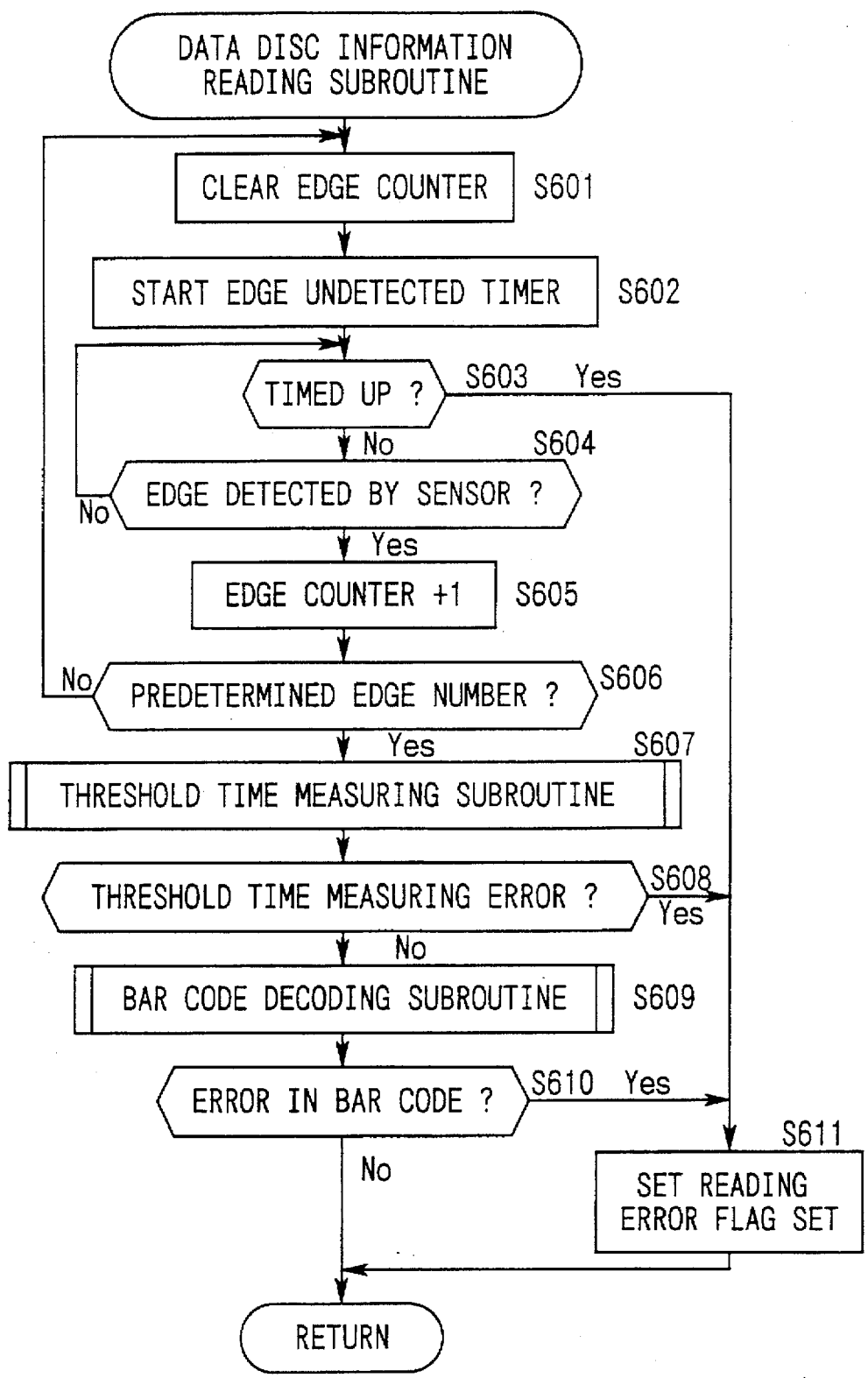
FIG. 7 is a detailed flow chart of a data disc information reading subroutine of step S506 of FIG. 5.

In step S505, an exposed state of the film is detected by a known method to determine if the film has not been exposed or has been exposed, for example. In step S506, a data disc information reading subroutine as shown in detail in FIG. 7 is performed. In this data disc information reading subroutine, each piece of coded information contained in the bar code pattern is decoded, as will be described later. Upon completion of the data disc information reading subroutine, the control flow proceeds to step S507 to stop the motor 4.

In step S508 of FIG. 6, it is determined whether the reading error flag that indicates that the coded information fails to be normally decoded is set during execution of the data disc information reading subroutine of step S506. If this flag is not set, step S509 is then executed to effect various settings on the camera body on the basis of decoded contents. For example, the ISO sensitivity and the total number of available frames of the film are set. If the reading error flag is set, on the other hand, the control flow goes to S519.

In step S510, it is determined whether the information on the total number of available frames of the film is correctly contained in the bar code pattern thus read. If an affirmative decision is obtained in step S510, step S511 is then executed to display the thus read total number of frames on the liquid crustal display 2. If the total number of frames is not correctly contained in the bar code pattern read, step S512 is then executed to display the frame number "1" on the liquid crystal display 2. The total number of frames is not correctly contained in the bar code pattern read where the total number of frames is not set in the original bar code printed on the film cartridge, or where the value (total number of frames) set in the original bar code is an inherently impossible value, or where the value (total number of frames), though originally set to a reasonable value, failed to be normally read out due to some problems in reading or decoding. The number of frames "1" is displayed in step S512 so as to inform the photographer that at least one picture can be taken. Thus, even if the correct information on the total number of frames of the film cannot be obtained, photographing on unexposed frames of the film is feasible.

Upon completion of the processing of step S511 or step S512, the control flow proceeds to step S513 to rotate the spool 22 forward so as to feed or thrust the film out of the cartridge 21 (thrust processing). More specifically, the leading first frame of the film is moved to an exposure position of the camera where the frame can be exposed. In the next step S514, it is determined whether the release switch SW is turned on by operation of the photographer, and, if it is turned on, S515 is executed to effect a known photographing process. In the photographing process, though details of which are not provided herein, a photographing lens is driven so that the camera is focused on an object, and a shutter is opened for a given time and closed, on the basis of the results of a focus adjusting information detecting processing, a photometry processing and the like. At this time, a flash may be generated as needed by an electronic flash unit.

Upon completion of the photographing process in step S515, step S516 is then executed to advance one frame by rotating the motor 4 forward and taking up a corresponding amount of the film. Subsequently, step S517 is executed to determine whether the terminal end of the film has been reached or not, and, if the terminal end has not been reached, the control flow returns to step S514. If the terminal end has been reached, step S518 is then executed to rewind the film. After the shielding door is closed in the next step S519, the main routine is terminated. Where the total number of available frames of the film cannot be correctly read in step S510, the number of frames displayed on the liquid crystal display 2 remains "1" until photographing on all of the frames has been done.

In the main routine of FIGS. 5 and 6 as described above, if the cartridge 21 shown in FIG. 2 is loaded into the camera, the motor 4 is first driven forward to open the shielding door 26, and then reversed to rotate the bar code pattern counterclockwise, so that the coded information within the data region DT of the bar code pattern is read and decoded by the sensor 3. Where the coded information could be normally decoded, the total number of frames of the film thus decoded is displayed on the liquid crystal display 2. Where the coded information cannot be normally (correctly) decoded, the number of frames "1" is displayed on the liquid crystal display 2. When a shutter release button is depressed by the photographer, the motor 4 is driven forward to rotate the spool 22 of the cartridge 21 forward, thereby to transport or feed the film. Once all of the frames of the film have been exposed, the motor 4 is reversed to rotate the spool 22 in the reverse direction, so that the film is accommodated within the cartridge 21. Thereafter, the motor 4 is driven forward to close the shielding door 26.

Referring to FIG. 7, the data disc information reading subroutine of step S506 of FIG. 5 will be next explained in detail. At the point of time when the subroutine of FIG. 7 is initiated, the bar code pattern is being rotated counterclockwise with the motor 4 reversed, following step S504 of FIG. 5.

In step S601 of FIG. 7, an edge counter is reset (cleared) which counts how many times the output level of the sensor 3 is reversed. In step S602, an edge undetected timer is started which measures time until the output level of the sensor 3 is reversed. In step S603, it is determined whether the edge undetected timer has timed up, namely, whether a predetermined time has elapsed since the edge undetected timer started measurement of time.

If the edge undetected timer has not timed up, step S604 is then executed to determine whether the output level of the sensor 3 has been reversed, namely, whether an edge (a boundary position of the coded information) has been detected. If the output level has not been reversed, the control flow returns to step S603. If the output level has been reversed, the control flow goes to step S605.

In step S605, the edge counter is incremented. In step S606, it is determined whether the count value of the edge counter has reached a predetermined value (such as 19). In the case of the bar code pattern of FIG. 3 in which 18 edges are present in one cycle, the bar code pattern is considered to have made one revolution when the count value of the edge counter becomes 19. Namely, in step S606 of FIG. 7, it is determined whether the bar code pattern has made one revolution, i.e., has rotated 360°. The above processing of steps S602–S606 in which the bar code pattern is rotated 360° before it is actually read is provided for stabilizing rotation of the bar code pattern, thereby to prevent errors in reading the bar code pattern.

Figure 8:
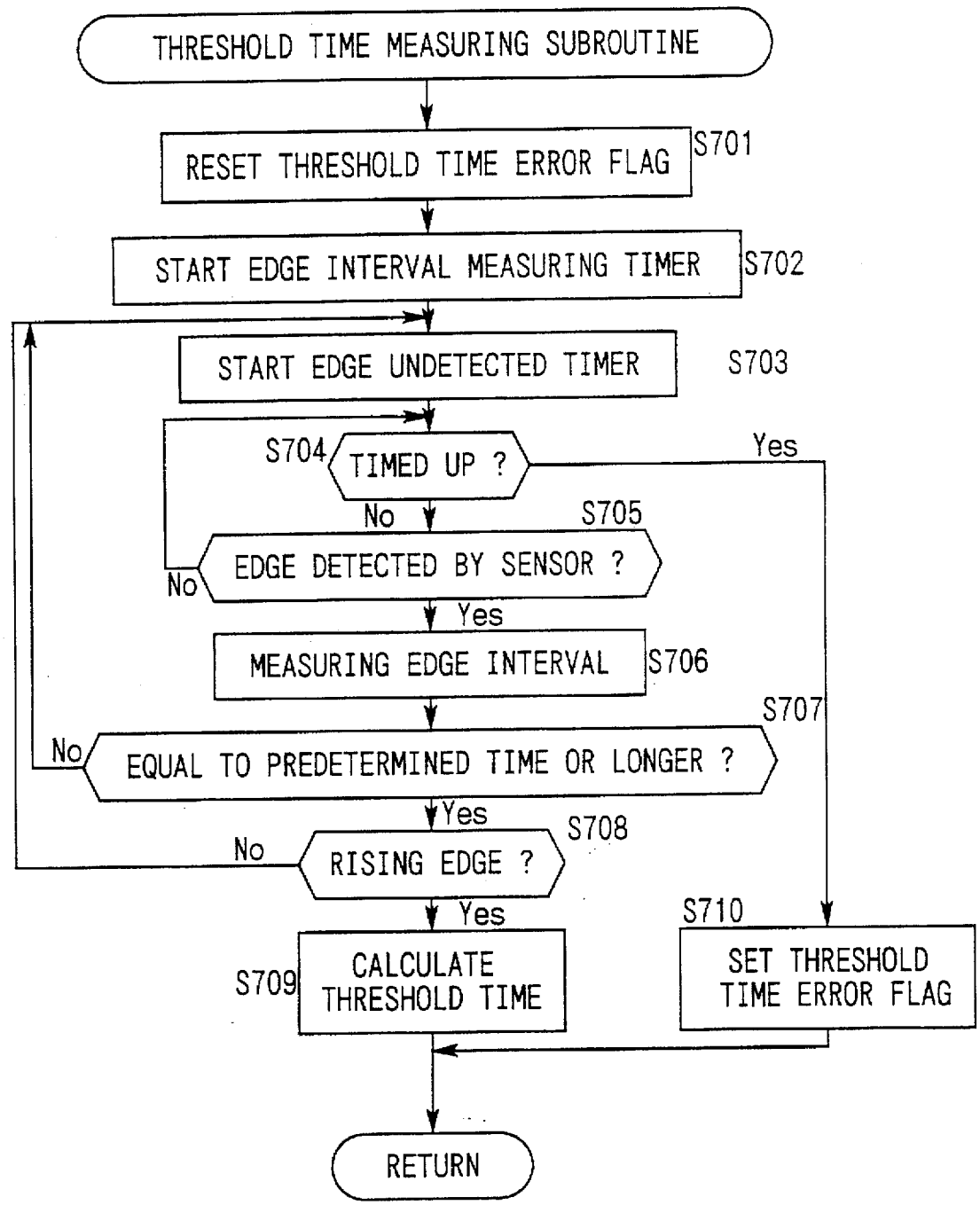
FIG. 8 is a detailed flow chart of a threshold time measuring subroutine of step S607 of FIG. 7.

If step S606 determines that the count value of the edge counter has reached the predetermined value, step S607 is then executed to perform a threshold time measuring subroutine as shown in detail in FIG. 8. This threshold time measuring subroutine is executed to calculate a threshold time that provides a basis for determining whether each element of coded information contained in the bar code pattern is narrow or wide, as will be described later.

In step S608, it is determined whether a threshold time measuring error flag that indicates that the threshold time failed to be calculated is set in the threshold time measuring subroutine of step S607. If the threshold time measuring error flag is not set in step S607, i.e., if a negative decision is obtained in step S608, step S609 is then executed to execute a bar code decoding subroutine processing as shown in detail in FIG. 9. This bar code decoding subroutine is effected to determine whether each element of coded information within the data region DT of the bar code pattern is narrow or wide, based on the code length of each element of the coded information detected by the sensor 3 and the threshold time calculated in step S607, as will be described later.

In step S610, it is determined whether a bar code decoding error flag that indicates a failure to discriminate between narrow and wide elements in the coded information is set in the bar code decoding subroutine of step S609. If this flag is determined to be set, S611 is then executed to set a reading error flag. The control flow also goes to step S611 when step S603 determines that the edge undetected timer has timed up, or when step S608 determines that the threshold time measuring error flag has been set. The control flow returns to the main routine of FIGS. 5 and 6 after the reading error flag is set in step S611.

In the data disc information reading subroutine of FIG. 7 as described above, the data disc 25 is initially rotated 360° so as to stabilize rotation of the data disc 25. In this process, the number of edges (boundary positions of the coded information) in the bar code pattern is counted by means of the sensor 3, and one revolution of the data disc 25 is determined based on the number thus counted. Subsequently, the threshold time for discriminating narrow elements from wide elements is calculated, and the thus calculated threshold time is used to determine whether each element of the coded information in the data region of the bar code pattern is narrow or wide.

Turning to FIG. 8, there will be explained in detail the threshold time measuring subroutine of step S607 of FIG. 7. Step S701 of FIG. 8 is initially executed to reset the threshold time error flag that is to be set when the threshold time cannot normally measured. In step S702, an edge interval measuring timer is started. In step S703, the edge undetected timer is started.

In step S704, it is determined whether the edge undetected timer has timed up or not, and, if it has not timed up, the control flow proceeds to step S705. In step S705, it is determined whether the output level of the sensor 3 is reversed, namely, whether the edge (boundary position of the coded information) is detected by the sensor 3. If the output level of the sensor 3 is not reversed, the control flow returns to step S704. If the output level of the sensor 3 has been reversed, step S706 is then executed. In this regard, the output of the sensor 3 is converted into a digital value by means of the A/D converter 1a, and the obtained digital value is compared with a threshold value stored in EEPROM 6. Thus, the determination as to whether the output level of the sensor 3 is reversed is made in the above step S705 by comparing the result of comparison between the current digital value and the threshold value, and the result of comparison between the digital value obtained in the last control cycle and the threshold value.

Step S706 is executed to measure a period of time (edge interval) starting when the output level of the sensor 3 is reversed last time and ending when it is reversed this time. In step S707, it is determined whether the edge interval is equal to or longer than a predetermined time (such as 90 msec), and, if it is less than the predetermined time, the control flow returns to step S703. If the edge interval is equal to or longer than the predetermined value, step S708 is then executed to determine whether the output of the sensor 3 is changed from a low level to a high level. If a negative decision is obtained in step S708, the control flow returns to step S703. If an affirmative decision is obtained in step S708, it is judged that the black zone BK as shown in FIG. 3 is detected, and the control flow proceeds to step S709. Namely, step S708 is meant to determine whether the edge interval that has been determined to be equal to or longer than the predetermined time corresponds to the black zone BK or the white zone WT as shown in FIG. 3. If the edge interval is judged to correspond to the black zone BK, the control flow proceeds to step S709.

In step S709, the threshold time based on which each element of the coded information in the data region DT is determined to be narrow or wide is calculated according to the following formula (1):

$$\text{threshold time} = (\text{black zone time})/\text{predetermined time} \quad (1)$$

"Black zone time" in the formula (1) means a period of time in which the black zone BK is detected by the sensor 3 during rotation of the bar code pattern. The predetermined time in the formula (1) is obtained according to the following formula (2):

$$(\text{black zone time}/\text{narrow zone time}) > \text{predetermined time} > (\text{black zone time}/\text{wide time}) \quad (2)$$

"Narrow time" in the formula (2) means a period of time in which a narrow element of the coded information (an element having a relatively small width) is detected by the sensor 3 during rotation of the bar code pattern, and "wide time" in the same formula means a period of time in which a wide element of the coded information (an element having a relatively large width) is detected by the sensor 3 during rotation of the bar code pattern.

If step S704 determines that the edge undetected timer has timed up, step S710 is then executed to set the threshold time error flag, and the control flow returns to the subroutine of FIG. 7.

In the threshold time measuring subroutine of FIG. 8 as described above, the threshold time is calculated based on the time period (black zone time) in which the black zone BK is detected by the sensor 3 during rotation of the bar code pattern. Thus, it is possible to provide a threshold time commensurate with the rotating speed of the bar code pattern.

Figure 9:
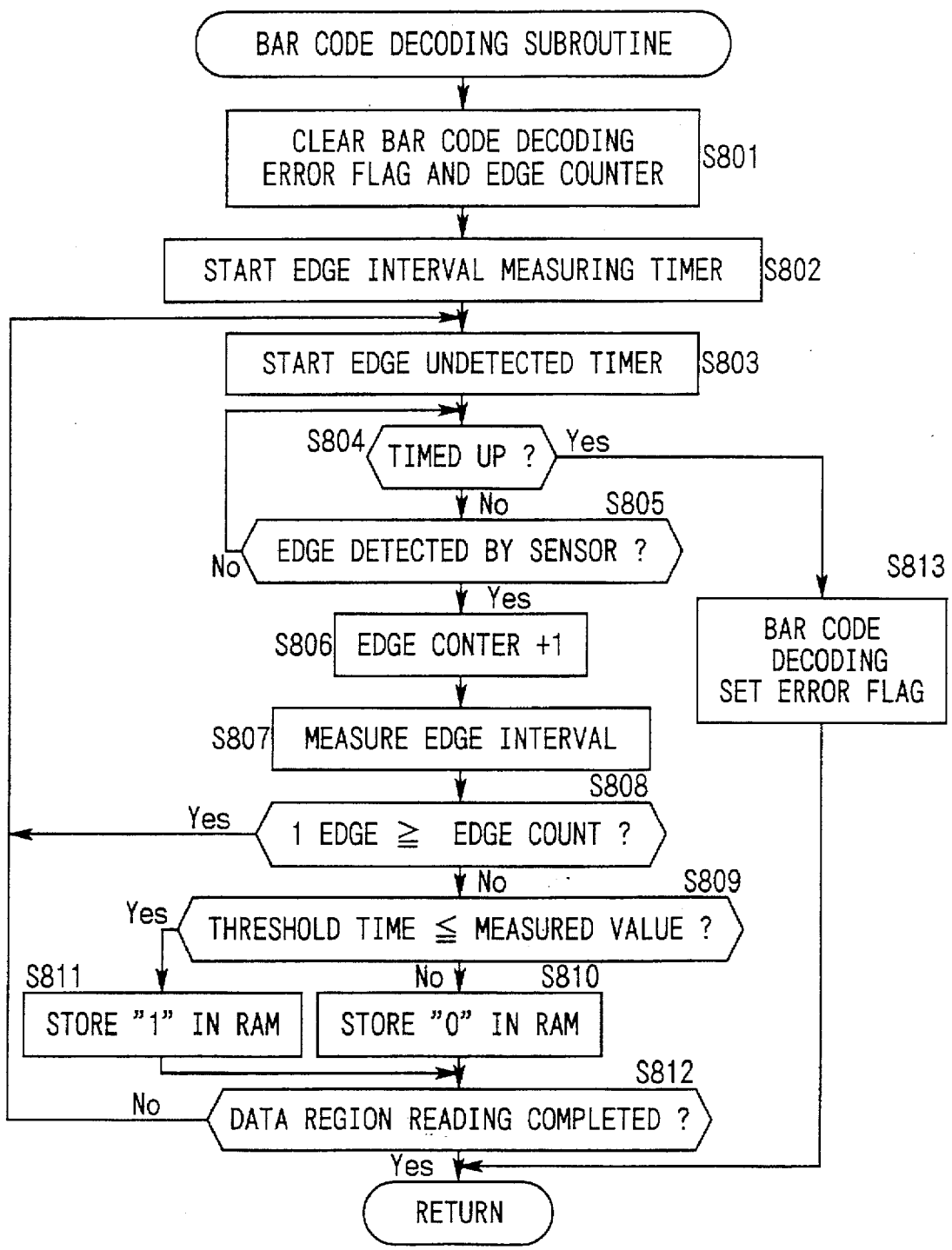
FIG. 9 is a detailed flow chart of a bar code determining subroutine of step S609 of FIG. 7.

Turning to FIG. 9, the bar code decoding subroutine of step S609 of FIG. 7 will be explained in detail. Step S801 of FIG. 9 is initially executed to reset the bar code decoding error flag that is to be set when each element of the coded information cannot be determined to be narrow or wide. At the same time, the edge counter for counting the number of edges detected by the sensor 3 is initialized to zero.

The edge interval measuring timer is started in step S802, and the edge undetected timer is started in step S803. In step S804, it is determined whether the edge undetected timer has timed up or not, and if it has not timed up, the control flow proceeds to step S805. In step S805, it is determined whether the output level of the sensor 3 has been reversed or not, namely, whether an edge (boundary position of the coded information) has been detected by the sensor 3 or not. If the output level of the sensor 3 has not been reversed, the control flow returns to step S804. If the output level has been reversed, the control flow proceeds to step S806.

In step S806, the edge counter is incremented. Step S807 is then executed to measure a period (edge interval) from the time when the output level of the sensor 3 is reversed last time to the time when it is reversed this time. In step S808, it is determined whether the count value of the edge counter is equal to or smaller than "1", and, if it is equal to or smaller than "1", the control flow returns to step S803. If the count value is larger than "1", the control flow proceeds to step S809. The above determination on the value of the edge counter is made because a space (white element) immediately following the black zone BK and ending at the first edge does not constitute data, and effective data start from a bar (black element) starting from the first edge.

In step S809, it is determined whether the edge interval measured in step S807 is equal to or longer than the threshold time obtained in the subroutine of FIG. 8, and, if the interval is less than the threshold value, step S810 is then executed to store "0" in RAM 7. If the edge interval is equal to or longer than the threshold time, on the other hand, the control flow proceeds to step S811 to store "1" in RAM 7.

Upon completion of the processing of step S810 or step S811, step S812 is then executed to determine whether the count value of the edge counter has reached a predetermined value (such as 18). The control flow returns to step S803 if the count value has not reached the predetermined value, and returns to the subroutine of FIG. 7 if the count value has reached the predetermined value. Since a total of 18 edges are present in one cycle in the case of the bar code pattern of FIG. 3, it is determined in step S812 whether reading of all the coded information in the data region DT has been completed, and, if the reading is determined to be completed, the control flow returns to the subroutine of FIG. 7.

If step S804 determines that the edge undetected timer has timed up, on the other hand, step S813 is then executed to set the bar code decoding error, and the control flow returns to the subroutine of FIG. 7.

In the bar code decoding routine of FIG. 9, the edge interval is detected by the sensor 3 with the bar code pattern rotated, and the thus detected edge interval is compared with the threshold time obtained in the threshold time measuring subroutine of FIG. 8, so as to decode the bar code pattern.

Second Embodiment

In the second embodiment, where it is judged that the bar code pattern cannot normally read in the data disc information reading subroutine, namely, where the reading error flag is set, the number of frames "1" is displayed on the liquid crystal display 2. Since the second embodiment is identical with the first embodiment except the main routine performed by CPU 1, only the main routine will be hereinafter explained.

Figure 10:
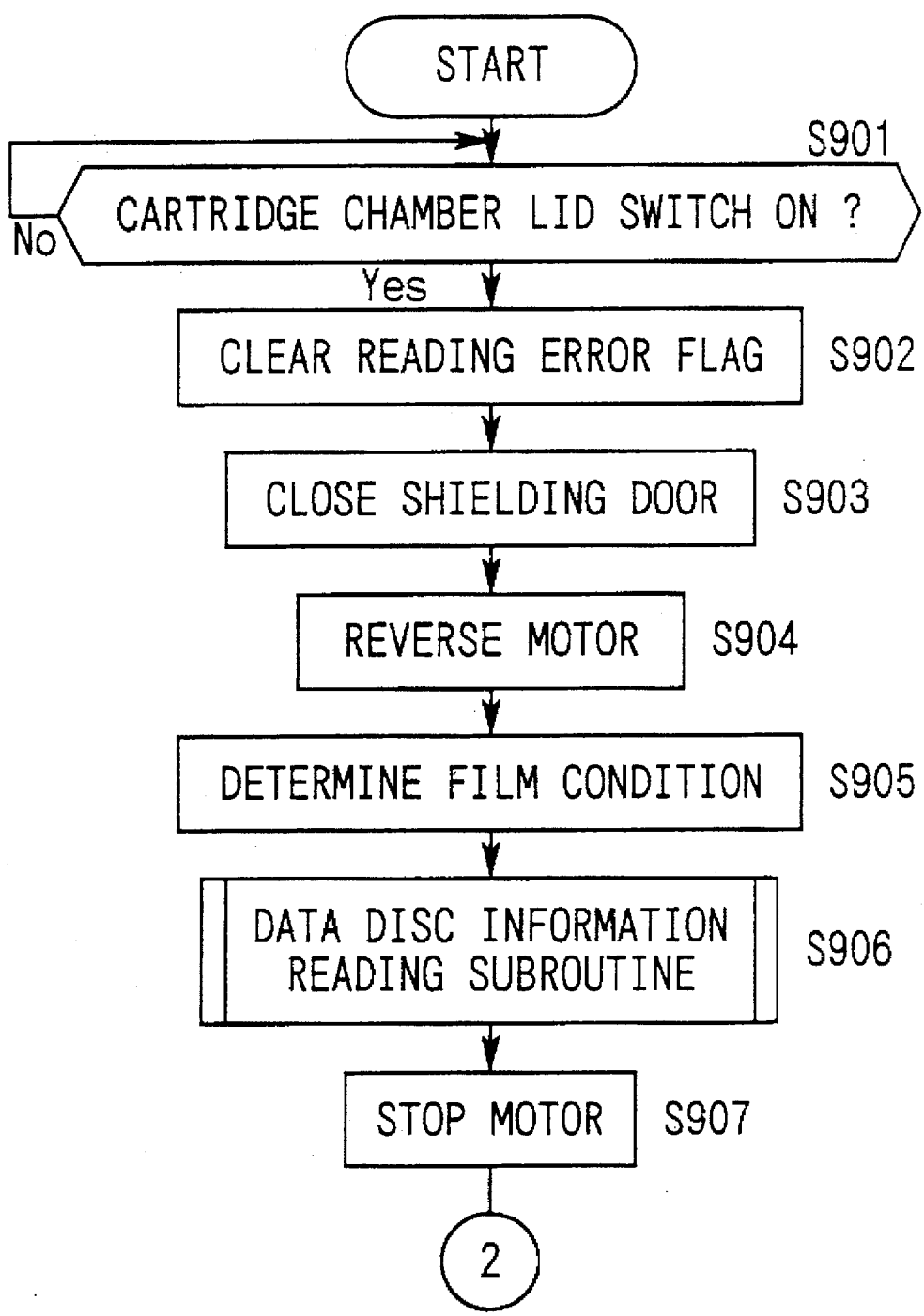
FIG. 10 is a flow chart showing a main routine executed by CPU of the second embodiment.
Figure 11:
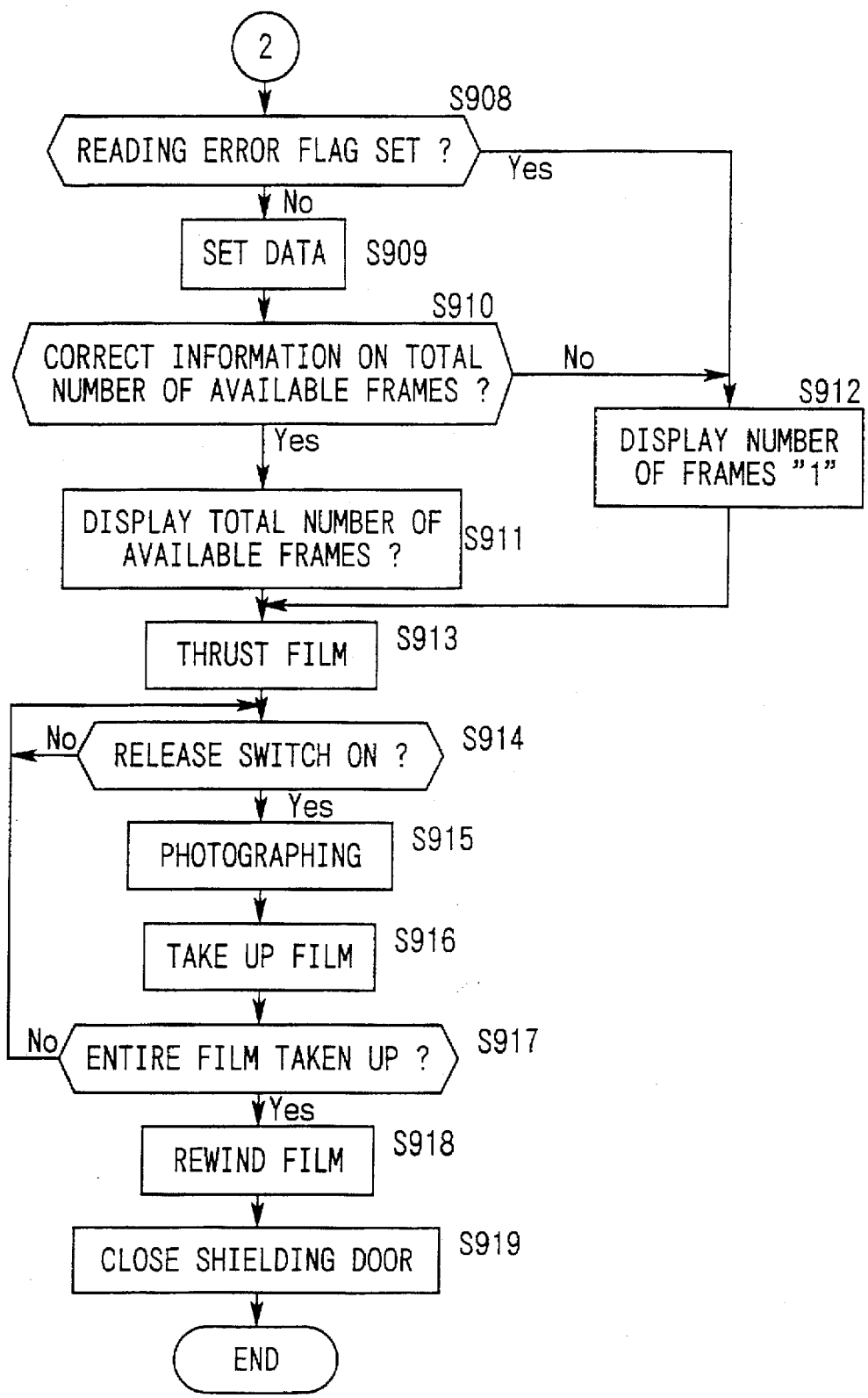
FIG. 11 is a flow chart following that of FIG. 10.

FIGS. 10 and 11 are flow charts showing the main routine performed by CPU 1 according to the second embodiment of the invention. Step S901 through step S907 of FIG. 10 are identical with step S501 through step S507 of FIG. 5, and thus will not be explained herein. In step S908 of FIG. 11, it is determined whether the reading error flag was set in the data disc information reading subroutine of step S906. If the reading error flag was not set, namely, if the bar code pattern was normally read, the control flow proceeds to step S909, and the following steps up to step 919 are executed in the same manner as in steps S509–S519 of FIG. 6.

If step S908 determines that the reading error flag has been set, on the other hand, step S912 is then executed to display the number of frames "1" on the liquid crystal display 2, and followed by step S913, rather than terminating the main routine as in the first embodiment.

With the above processing performed, it is possible to continue photographing with the currently loaded film even if the bar code pattern printed on the film cartridge could not normally read. Thus, the camera of the second embodiment is less likely to be inhibited from photographing than that of the first embodiment, whereby the film can be effectively utilized.

While photographing continues until all frames of the film have been exposed in the main routines of FIGS. 5, 6, 10 and 11, the routines may be terminated while one or more frames still remain(s) unexposed. While the coded information read from the bar code pattern is compared with a reference code preliminarily stored in the CPU 1, so as to set data in the processing of FIG. 6, the reference code may be stored in a memory or the like (such as EEPROM provided outside CPU 1) other than the CPU 1.

While various kinds of information relating to a film is recorded in the form of a bar code pattern in the first and second embodiments, a recording member bearing a DX code may be used instead of that bearing the bar code pattern, so that various kinds of information relating to the film can be obtained by detecting ON and OFF states of electrical contacts. In this case, the DX code provided on the cartridge 21 is patterned to represent information relating to the film, and ON and OFF states of the electric contacts of this DX code are detected so that the total number of available frames of the film is displayed on the liquid crystal display 2 where this number is normally detected, and the number of frames "1" is displayed where the above number is not normally detected.

While specific numeral values have been indicated as the values of the edge counter and others in the above description of the first and second embodiments, these specific values are illustrative only and any other values may be used within the scope of the present invention. Although the timing of turning-on (light emission) and turning-off of the sensor 3 is not particularly specified in the first and second embodiments, the sensor 3 may emit light only when the processing of steps S505 and S506 of FIG. 5 is effected, or by operations of a main power source or a shutter release button of the camera, for example.

Third Embodiment

Figure 12:
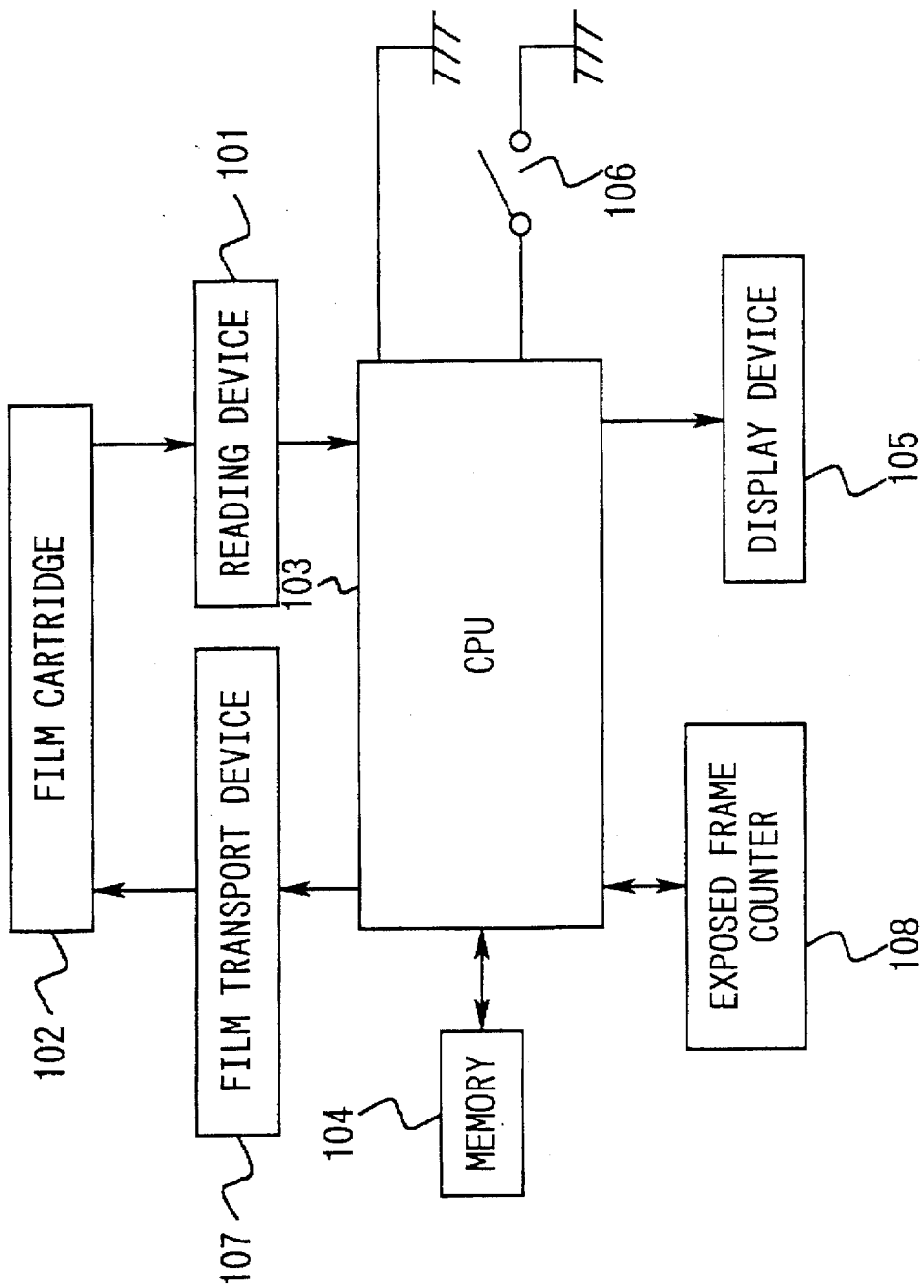
FIG. 12 is a block diagram showing the third embodiment of a camera of the present invention.
Figure 13:
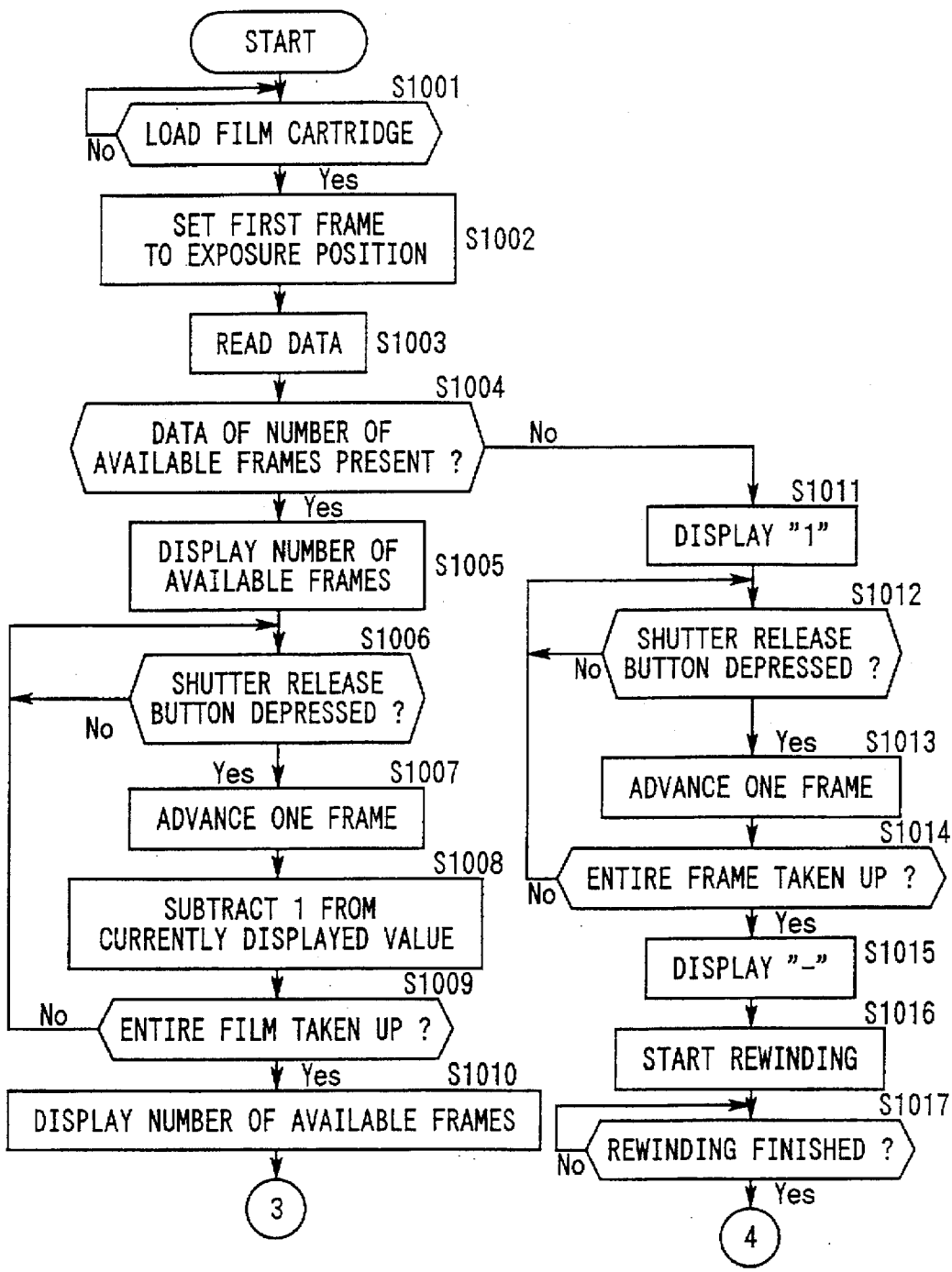
FIG. 13 is a flow chart that explains the operation of the camera shown in FIG. 12.
Figure 14:
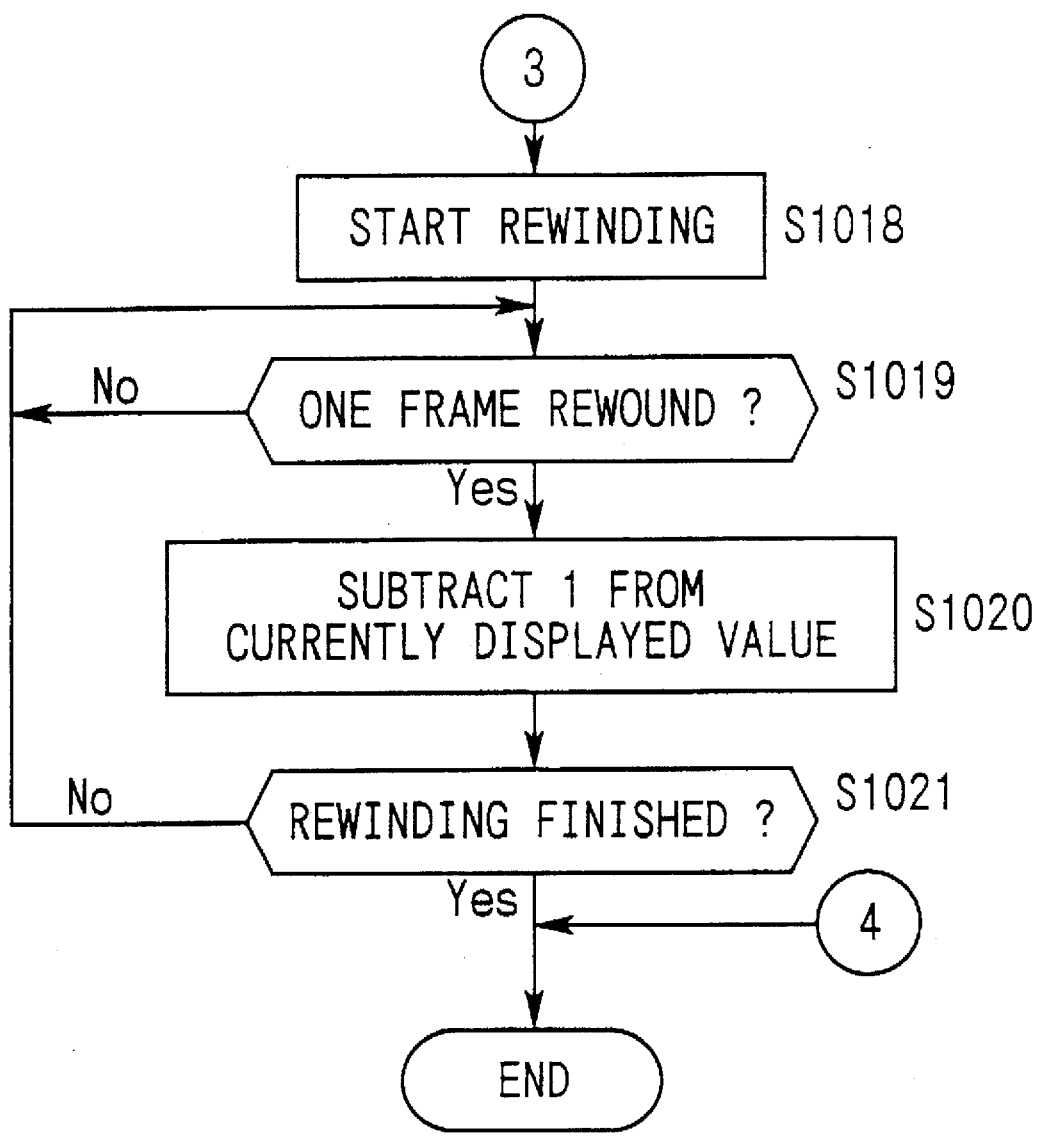
FIG. 14 is a flow chart following that of FIG. 13.

Referring to FIGS. 12–14, there will be explained the third embodiment of the present invention. FIG. 12 is a block diagram showing the construction of the camera of the present invention. Reading device 101 reads data relating to a film and recorded on a film cartridge 102, which data include the number of frames of the film available for photographing and the sensitivity of the film, and transmits the data to CPU 103. The film cartridge 102 is provided with a conductive pattern or an optical pattern that corresponds to such film data, and the conductive pattern is detected with electric contacts or the optical pattern is detected by an optical detector such as a photoreflector, in the reading device 101.

Memory 104 stores the data read by the reading device 101. Display device 105 is adapted to display marks representing the number of remaining frames of the film and rewinding and other operating conditions. CPU 103 causes the display device 105 to display such marks based on the number of available frames that is read by the reading device 101 and the number of frames that have been exposed, and a film transporting condition and others. While a liquid crystal display is used as the display device 105 in the present embodiment, needles or pointers may be used to point to numbers or the like on a dial scale plate. Each time a release switch 106 is turned on, measurements of light, distance and others are made, and an exposure operation is effected with a sector of a shutter (not shown) being opened. Thereafter, a film transport device 107 takes up the film to advance only one frame. The number of exposure operations, namely, the number of frames that have been exposed, is counted by an exposed frame counter 108, based on signals received from the release switch 106.

FIGS. 13 and 14 are flow charts showing the operation of the CPU 103. The flow chart of FIG. 13 is followed by that of FIG. 14. In FIG. 13, the control flow starts when a main switch of the camera is turned on. In step S1001, it is determined whether the film cartridge 102 is loaded into the camera. If an affirmative decision is obtained in step S1001, step S1002 is then executed to perform easy-loading to feed the film so that the first frame is placed in an exposure position. In step S1003, the reading device 101 reads data representative of the number of available frames of the film. Step S1004 determines whether the data read in step S1003 coincide with any of a plurality of sets of data stored in the memory 104, which represent a plurality of numbers of frames available for photographing. If an affirmative decision is obtained in step S1004, the control flow proceeds to step S105. If a negative decision is obtained in step S1004, e.g., where the data are not correctly read or where no data are present on the cartridge, the control flow goes to step S1011.

In step S1005, the number of available frames of the film is displayed on the display device 105. In step S1006, it is determined whether a shutter release button of the camera is depressed and the release switch 106 is turned on. If the release switch 106 is turned on, step S1007 is then executed to take up the film to advance one frame. Step S1008 is then executed to subtract 1 from the numerical value currently displayed on the display device 105, and display the obtained value on the display device 105. In step S1009, it is determined whether the entire film has been taken up or wound, namely, whether the numerical value on the display device 105 that represents the number of remaining unexposed frames is zero. If the entire film has been taken up, the control flow goes to step S1010. If a negative decision is obtained in step S1009, the control flow returns to step S1006.

In step S1010, the number of available frames originally contained in the film cartridge 102 is displayed again on the display device 105. Step S1018 (FIG. 14) is then executed to start rewinding, followed by step S1019 which determines whether the film has been rewound by an amount corresponding to one frame. If one frame has been rewound, step S1020 is then executed to display on the display device 105 the numerical value obtained by subtracting 1 from the value currently displayed on the display device 105. In step S1021, it is determined whether rewinding of the film has been completed. If a negative decision is obtained in step S1021, the control flow returns to step S1019. If an affirmative decision is obtained in step S1021, the series of operations is terminated.

On the other hand, when the control flow goes from step S1004 to step S1011, namely, when the reading device 101 failed to correctly read data representative of the number of available frames of the film, or when the film cartridge 2 itself does not have any data thereon, the numeral value "1" is displayed on the display device 105 in step S1011. Step S1012 is then executed to determine whether the shutter release button of the camera is depressed and the release switch 106 is turned on. If the release switch 106 is turned on, the control flow proceeds to step S1013 to take up the film to advance one frame.

Subsequently, step S1014 is executed to determine whether the entire film has been taken up or wound, and, if an affirmative decision is obtained in step S1014, the control proceeds to step S1015. If a negative decision is obtained in step S1014, the control flow returns to step S1012. After step S1015 is executed to display a minus sign (−) on the display device 105, step S1016 is then executed to initiate rewinding of the film. Step S1017 determines whether rewinding of the film has been completed or not. If the rewinding has been completed, the series of operations are terminated.

While only 1 is subtracted from the numerical value displayed on the display device 105 each time the film is rewound by one frame during rewinding of the film as explained with respect to step S1020 in the above-described third embodiment, the display mode or manner of displaying is not limited to that of the third embodiment. For instance, the English letter "R" may be displayed during a rewinding operation, and the numerical value "0" may be displayed upon completion of the rewinding operation. Similarly, the display mode is not limited to that of the third embodiment where the control flow goes from step S1004 to step S1011.

As described above, in the third embodiment, the number of remaining unexposed frames during photographing is displayed on the display device 105, and, where data representative of the number of available frames of the film fail to be read from the film cartridge 102 or where a film cartridge bearing no data is used, a mark is displayed on the display device 105 in a different display mode than in the case where data representative of the number of available frames are normally read. This allows a camera user to easily know the number of remaining unexposed frames and a failure in reading data. Also, the display device 105 successively displays numerical values obtained as a result of subtraction from the number of available frames of the film during a rewinding operation, thus making it easy for the camera user to be informed that the rewinding operation is being effected.

While the above-described third embodiment is concerned with a camera of a type in which the first frame and following frames of the film are successively taken up each time a picture is taken, the present invention can be similarly applicable to a camera of a pre-wind type in which the entire film is initially taken up upon loading of the film, and then rewound one frame by one frame each time a picture is taken.

What is claimed is:

1. A camera adapted to receive a film cartridge having a recording member on which is recorded information relating to a total number of available frames in a film, comprising:

an information detector that detects said information relating to the total number of available frames that is recorded on said recording member;

a display unit that displays said information relating to the total number of available frames;

an abnormality judging unit that determines whether any abnormality is present in said information relating to the total number of available frames that is detected by said information detector; and a display controller that controls a display of said display unit according to a result of judgement made by said abnormality judging unit.

2. A camera according to claim 1, wherein said display controller causes said display unit to display the total number of available frames detected by said information detector when said abnormality judging unit judges that no abnormality is present, and causes said display unit to display a predetermined number of frames when said abnormality judging unit judges that an abnormality is present in said information relating to the total number of available frames.

3. A camera according to claim 1, further comprising:

a frame counter that counts a number of exposed frames; and wherein said display controller causes said display unit to display a numerical value obtained by subtracting the number of exposed frames counted by said frame counter, from the total number of available frames detected by said information detector, when said abnormality judging unit judges that no abnormality is present in said information relating to the total number of available frames.

4. A camera according to claim 2, wherein said predetermined number of frames is 1.

5. A camera according to claim 1, wherein said recording member is rotatable with a spool of said film cartridge, and comprises a bar code pattern.

6. A camera adapted to receive a film cartridge having a recording member on which is recorded information relating to a total number of available frames in a film, comprising:

an information detector that detects said information relating to the total number of available frames that is recorded on said recording member;

a display unit that displays said information relating to the total number of unexposed frames;

an abnormality judging unit that makes at least one of a determination as to whether said information relating to the total number of available frames has been successfully detected by said information detector, and a determination as to whether any abnormality is present in said information relating to the total number of available frames that is detected by said information detector; and a display controller that causes said display unit to display an indication that a number of remaining unexposed frames is small where said abnormality judging unit determines that said information relating to the total number of available frames fails to be detected or where an abnormality is present in said information relating to the total number of available frames.

* * * * *